United States Patent
Oh et al.

(10) Patent No.: US 9,501,177 B2
(45) Date of Patent: Nov. 22, 2016

(54) VARIABLE MOUNTING SOUND WAVE TOUCH PAD

(71) Applicant: Hyundai Motor Company, Seoul (KR)

(72) Inventors: Kwang Myung Oh, Daejeon (KR); Hui Sung Lee, Gunpo-si (KR); Sung Min Park, Seoul (KR); Sung Jin Sah, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 13 days.

(21) Appl. No.: 14/464,364

(22) Filed: Aug. 20, 2014

(65) Prior Publication Data

US 2015/0286307 A1    Oct. 8, 2015

(30) Foreign Application Priority Data

Apr. 4, 2014  (KR) .................. 10-2014-0040441

(51) Int. Cl.
   *G06F 3/043*    (2006.01)
(52) U.S. Cl.
   CPC ..................... *G06F 3/043* (2013.01)
(58) Field of Classification Search
   CPC .... G06F 3/041; G06F 3/043; G02F 1/13338; H04R 2499/11
   See application file for complete search history.

(56) References Cited

U.S. PATENT DOCUMENTS

| | | | |
|---|---|---|---|
| 4,391,292 A * | 7/1983 | Millar | ................... F16K 11/048 137/269 |
| 5,072,427 A | 12/1991 | Knowles | |
| 5,591,945 A | 1/1997 | Kent | |
| 5,648,643 A | 7/1997 | Knowles et al. | |
| 2004/0160421 A1* | 8/2004 | Sullivan | ................ G06F 3/0436 345/173 |
| 2005/0156911 A1 | 7/2005 | Tanaka et al. | |
| 2006/0244732 A1* | 11/2006 | Geaghan | ................ G06F 3/041 345/173 |
| 2010/0268121 A1* | 10/2010 | Kilborn | .................. A61B 5/412 600/587 |
| 2011/0096036 A1* | 4/2011 | McIntosh | ................ G06F 3/043 345/177 |
| 2011/0304581 A1 | 12/2011 | An et al. | |
| 2014/0320276 A1* | 10/2014 | Maschmeyer | .......... G06F 3/016 340/407.2 |

FOREIGN PATENT DOCUMENTS

| | | |
|---|---|---|
| JP | 2007-511015 A | 4/2007 |
| KR | 1999-007881 A | 1/1999 |
| KR | 2003-0051859 A | 6/2003 |
| KR | 10-0856919 B1 | 9/2008 |
| KR | 10-2011-0136129 A | 12/2011 |
| KR | 10-2012-0030202 A | 3/2012 |

* cited by examiner

*Primary Examiner* — Charles Hicks
(74) *Attorney, Agent, or Firm* — McDermott Will & Emery LLP

(57) ABSTRACT

A variable mounting sound wave touch pad includes an upper touch pad connected to a microphone to recognize a sound wave. A lower touch pad is spaced apart from the upper touch pad. A plurality of mounting members have one end attached to the lower touch pad and the other end protruding toward the upper touch pad and vary by an actuator which interlocks with the lower touch pad.

9 Claims, 9 Drawing Sheets

Voltage off

Voltage on

VARIABLE MOUNTING SOUND WAVE TOUCH PAD

CROSS-REFERENCE TO RELATED APPLICATION

This application is based on and claims the benefit of priority to Korean Patent Application No. 10-2014-0040441, filed on Apr. 4, 2014 in the Korean Intellectual Property Office, the disclosure of which is incorporated herein in its entirety by reference.

TECHNICAL FIELD

The present disclosure relates to a variable mounting sound wave touch pad, and more particularly, to a variable mounting sound wave touch pad which may deform a height of a mounting member provided in a sound wave touch pad to allow a user to detect a sound wave generated when the user touches the sound wave touch pad.

BACKGROUND

Generally, a touch pad may be linked with a computer through a screen to directly input or output information and detect coordinates of a touched position when a human hand or an object touches a character or a specific location which is displayed on a screen to carry out a specific processing corresponding to a menu of the coordinates selected by software from the coordinates.

Therefore, the touch pad provides a function as an information display unit and a function as an input unit.

Recently, the touch pad using a sound wave has been used. In this case, the sound wave touch pad estimates a position of a finger using a sound wave sensor.

The sound wave touch pad requires at least two microphones to recognize the position of the touch. In this case, to recognize the position using one microphone, a change in energy absorption may be recognized by changing roughness of a surface of the touch pad and vibrating the touch pad in advance.

However, the touch pad using a sound wave according to the related art has a limited recognition effect when there is no rubbing input in the method for using surface roughness. Since multiple knocking frequencies need to be recognized to carry out many commands, a system recognition error may occur, and since the user input and the feedback are not performed, the convenience of use may be degraded.

SUMMARY

The present disclosure has been made to solve the above-mentioned problems occurring in the prior art while advantages achieved by the prior art are maintained intact.

An aspect of the present disclosure provides a variable mounting sound wave touch pad, and more particularly, a variable mounting sound wave touch pad which may deform a height of a mounting member provided in a sound wave touch pad to allow a user to detect a sound wave generated when the user touches the sound wave touch pad.

According to an exemplary embodiment of the present disclosure, a variable mounting sound wave touch pad includes an upper touch pad connected to a microphone to recognize a sound wave. A lower touch pad is spaced apart from the upper touch pad. A plurality of mounting members have one end attached to the lower touch pad and the other end protruding toward the upper touch pad and vary by an actuator which interlocks with the lower touch pad.

The upper touch pad may have one microphone.

The actuator may deform the mounting members and interlock with a system controller which classifies and processes a sound wave signal.

The system controller may perform a control to change vibration characteristics of the upper touch pad depending on positions at which the mounting members are grounded to the upper touch pad or the number of grounded mounting members.

The mounting members may be provided with an electroactive polymer, and the shape of the electroactive polymer deforms when an electrical signal is applied.

The mounting member may be provided with a solenoid plunger which moves when being applied with an electrical signal.

The mounting member may be provided with a piezoelectric ceramic element, the shape of the piezoelectric ceramic element deforms due to a pressure generated when an electrical signal is applied.

The plurality of mounting members attached to the lower touch pad may have different heights in which the mounting member and the upper touch pad may be grounded to each other or may not be grounded to each other.

According to another exemplary embodiment of the present disclosure, a variable mounting sound wave touch pad includes an upper touch pad connected to a microphone to recognize a sound wave, and the upper touch pad flexibly formed. A lower touch pad is spaced apart from the upper touch pad. A plurality of mounting members have one end attached to the lower touch pad and the other end protruding toward the upper touch pad in which each member has a different height.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Exemplary embodiments of the present disclosure will be described in detail with reference to the accompanying drawings.

Figure 1:
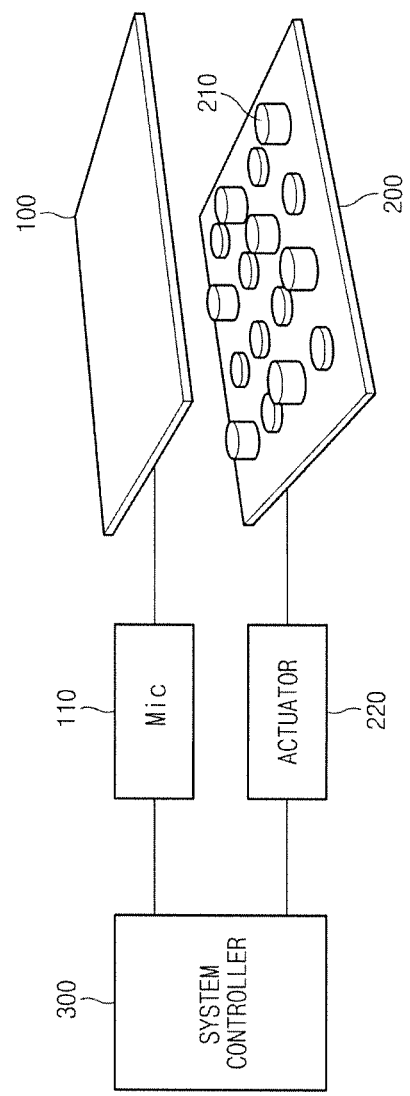
FIG. 1 is a diagram illustrating a variable mounting sound wave touch pad according to an exemplary embodiment of the present disclosure.

As illustrated in FIG. 1, a variable mounting sound wave touch pad according to an exemplary embodiment of the present disclosure includes an upper touch pad 100 and a lower touch pad 200 which are spaced apart. A variable mounting member 210 is attached to the lower touch pad 200.

The upper touch pad 100 is a touch pad using a sound wave and may generate a sound at the time of detecting an operation of the touch pad by a user.

In this case, the upper touch pad 100 is provided with a microphone 110 which recognizes a sound wave.

The upper touch pad 100 is provided with only one microphone 110, and thus, a pad structure is simple, thereby saving costs.

However, according to an exemplary embodiment of the present disclosure, even though the upper touch pad 100 is provided with only one microphone 110, a sound wave recognizing function may be implemented, and thus, a single microphone structure is used. When the precise control is required, the upper touch pad 100 may be provided with a plurality of microphones 110.

The lower touch pad 200 is spaced apart from the upper touch pad 100 and supports the mounting member 210 to be described below.

One end of the mounting member 210 is attached to the lower touch pad 200, and the other end thereof protrudes toward the upper touch pad 100.

The mounting member 210 is provided in plural and may vary by an actuator 220 which interlocks with the lower touch pad 200.

In this case, the actuator 220 may deform the mounting member 210 and interlock with a system controller 300 which classifies and processes a sound wave signal.

In this case, the system controller 300 may control to change vibration characteristics of the upper touch pad 100 according to positions at which the mounting members 210 are grounded to the upper touch pad 100 or the number of grounded mounting members 210.

That is, according to exemplary embodiments of the present disclosure, when the mounting members 210 interlock with the actuator 220 in a state in which the upper touch pad 100 attached with the microphone 110 is disposed at an upper side, and the lower touch pad 200 provided with the mounting members 210 is disposed at a lower side to receive an electrical signal, the mounting members 210 is changed. Thus, when a user touches the upper touch pad 100, the upper touch pad 100 may contact the mounting members 210. In this case, the generated sound wave signal is classified and processed by the system controller 300, thereby recognizing a touch position and an input pattern of the touch pad.

In this case, according to an exemplary embodiment of the present disclosure, since the mounting members 210 are grounded to the upper touch pad 100, the variable mounting sound wave touch pad may change the sound wave generated at the time of touch. Further, depending on the grounded degree, the flowability of the upper touch pad 100 is reduced at a strong ground, and thus, a high frequency is generated. The flowability of the upper touch pad 100 is increased at a weak ground, and thus, a low frequency is generated when there is a shock on the pad touch.

Since the mounting members 210 are not grounded to the upper touch pad 100 but protruding toward the upper touch pad 100, the upper touch pad 100 collides with an adjacent mounting member 210 when the upper touch pad 100 is touched, thereby generating a sound wave with different characteristics.

Figure 2A:
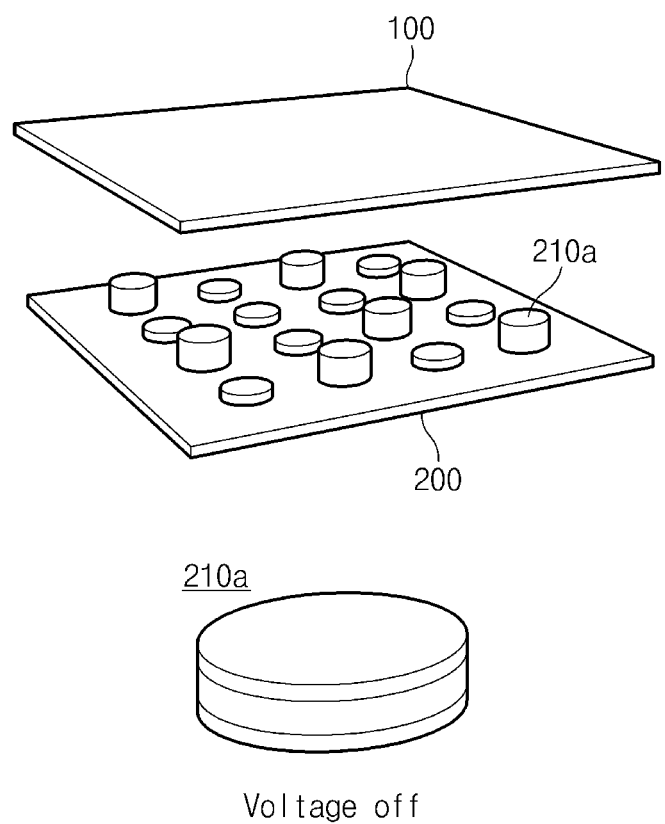
FIGS. 2A and 2B are diagrams illustrating that in a variable mounting sound wave touch pad according to an exemplary embodiment of the present disclosure, a mounting member is provided with an electroactive polymer.
Figure 2B:
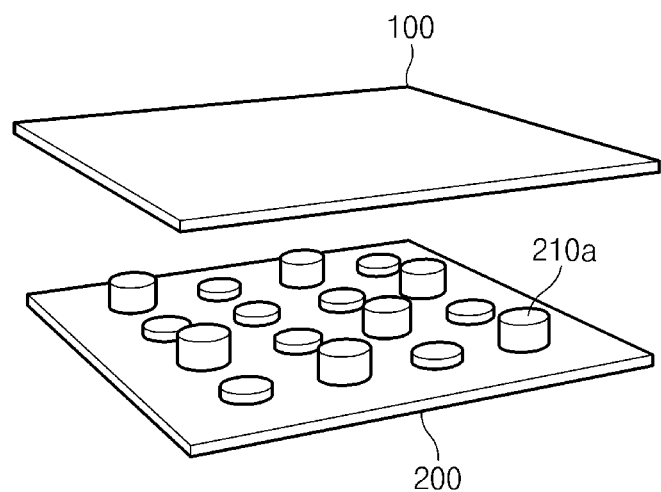
Figure 2B:

As illustrated in FIGS. 2A and 2B, the mounting member 210 according to an exemplary embodiment of the present disclosure may be provided with an electroactive polymer 210a which deforms when an electrical signal is applied through the actuator 220 (see FIG. 1). That is, when the mounting member 210 of the electroactive polymer 210a is applied with electricity, an electric field is generated, and thus, a shape of the mounting member 210 may deform. The mounting member may become shorter as the mounting member 210 becomes flatter, or it may become taller as a thickness of the mounting member 210 increases.

Figure 3:
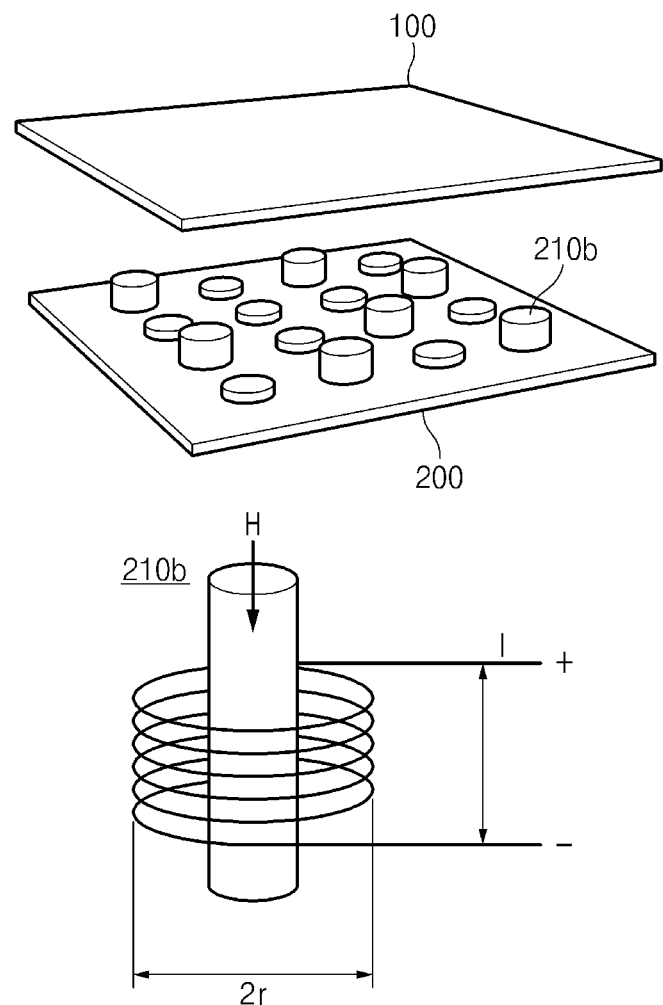
FIG. 3 is a diagram illustrating that in a variable mounting sound wave touch pad according to an exemplary embodiment of the present disclosure, the mounting member is provided with a solenoid plunger.

Referring to FIG. 3, the mounting member 210 according to an exemplary embodiment of the present disclosure may be provided with a solenoid plunger 210b which may move when the electrical signal is applied through the actuator 220 (see FIG. 1). When the mounting member 210 of the solenoid plunger 210b is applied with electricity, magnetism is generated in a magnetic circuit enclosing a coil, and a magnetic field of the magnetic circuit generates a magnetic force H in the plunger which is an iron rod to be able to move the plunger in an arrow direction.

The mounting member 210 according to the exemplary embodiment of the present disclosure may vertically move by the operation of the actuator 220.

Figure 4A:
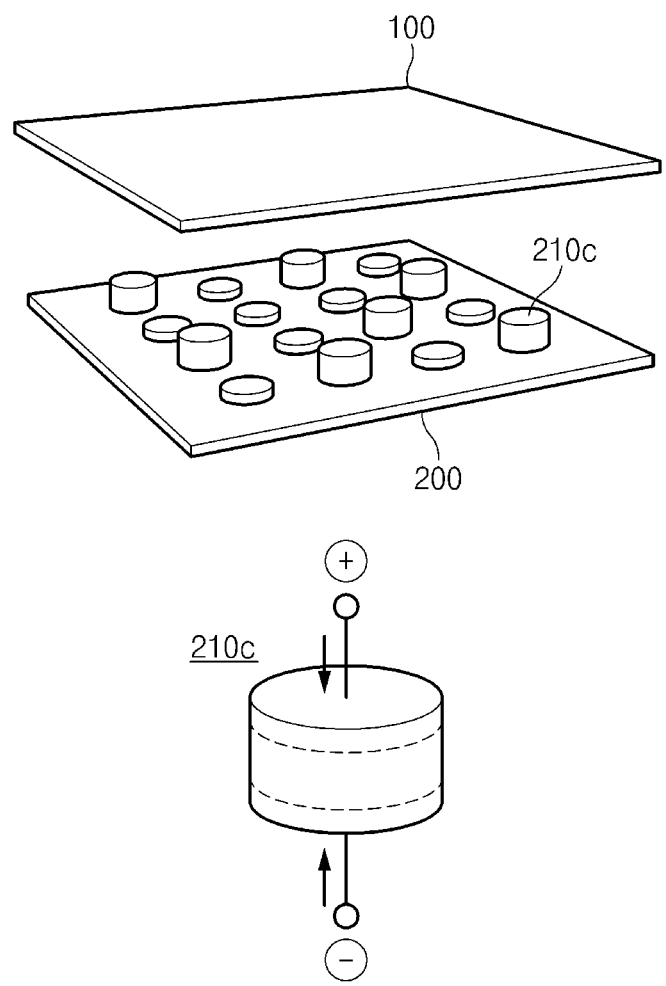
FIGS. 4A to 4C are diagrams illustrating that in a variable mounting sound wave touch pad according to an exemplary embodiment of the present disclosure, the mounting member is provided with a piezoelectric ceramic element.
Figure 4B:
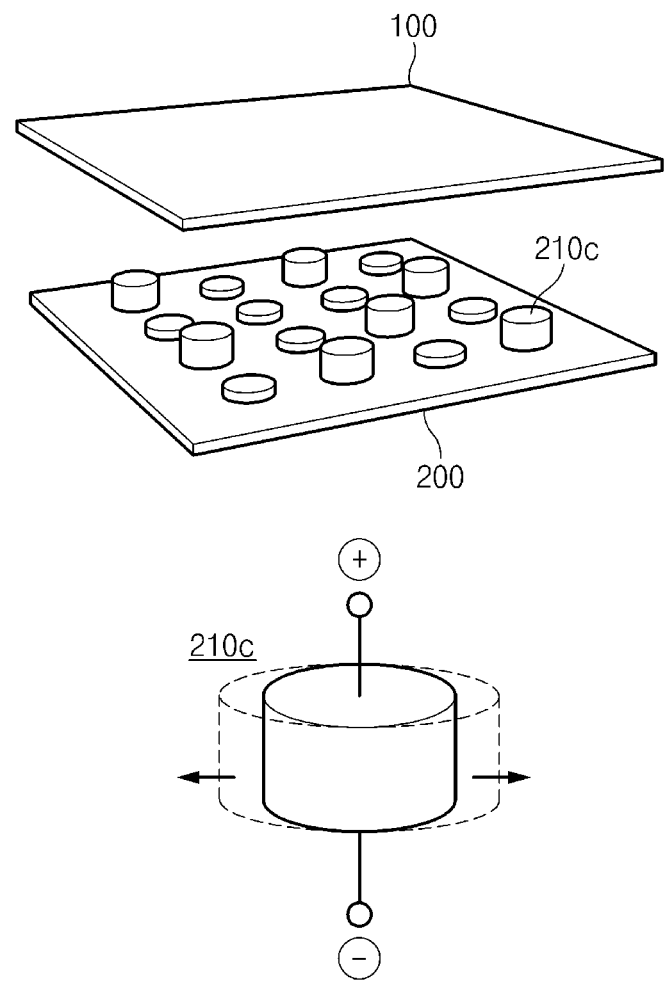
Figure 4C:
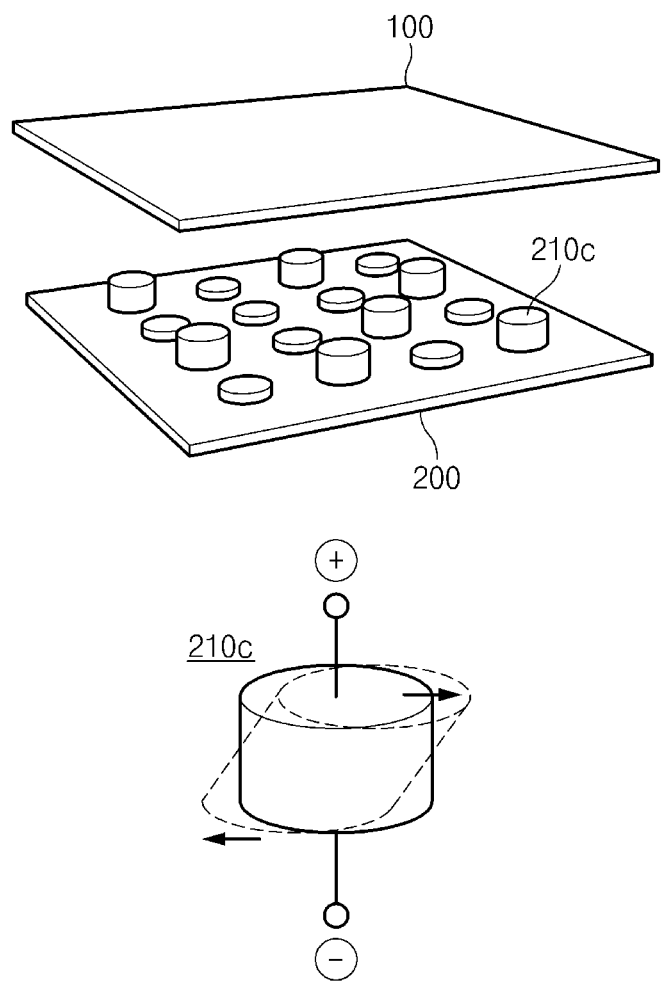

As illustrated in FIGS. 4A to 4C, the mounting member 210 according to an exemplary embodiment of the present disclosure may be provided with a piezoelectric ceramic element 210c which deforms due to a pressure generated when the electrical signal is applied through the actuator 220 (see FIG. 1). That is, when the mounting member 210 of the piezoelectric ceramic element 210c is applied with electricity, the pressure is generated, and thus, a potential difference is generated in the piezoelectric ceramic element 210c, such that a physical shape of the mounting member 210 may be changed.

Figure 5:
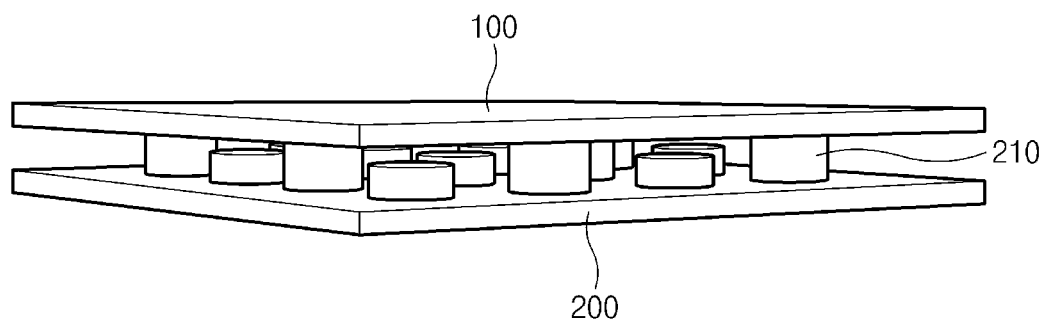
FIG. 5 is a diagram illustrating that in a variable mounting sound wave touch pad according to an exemplary embodiment of the present disclosure, a height of the mounting member is different.

Further, as illustrated in FIG. 5, the mounting members 210 attached to the lower touch pad 200 according to an exemplary embodiment of the present disclosure have different heights, and thus, the mounting members 210 and the upper touch pad 100 are grounded to each other or are not grounded to each other, such that the sound wave signal may be generated by the contact between the upper touch pad 100 and the mounting member 210 when a user touches the touch pad.

When the mounting members 210 have is provided to have different heights, there is a freely vibrating portion of the upper touch pad 100 depending on the position of the upper touch pad 100, and there is a grounded portion of the upper touch pad 100 to the mounting member 210, and thus, the upper touch pad 100 fixedly vibrates. In this case, since a space between the upper touch pad 100 and the lower touch pad 200 is fixed, the upper touch pad 100 is strongly or weakly grounded to the mounting member 210 depending on the height of the mounting member 210. Therefore, different sound waves may be generated even though the user applies the same impact to each position of the touch pad.

Since the system controller 300 controls the position of the mounting member 210 depending on the situation, the user may easily recognize which portion is touched based on the nature of the sound wave generated from the upper touch pad 100 and may easily recognize which step of the function menus is currently being operated based on a pressed degree and characteristics of a ringing sound at the time of input.

Figure 6:
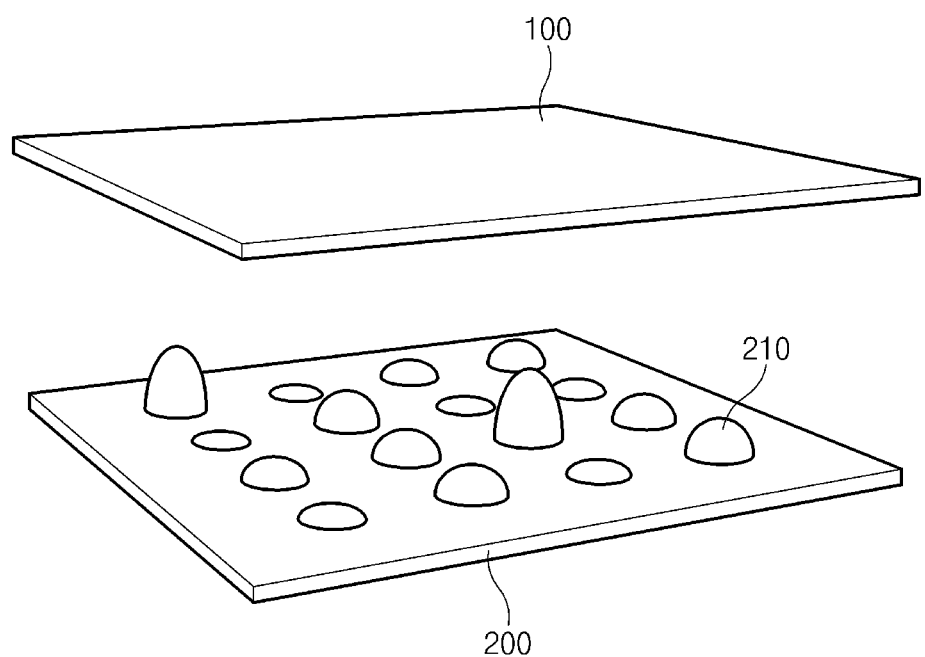
FIG. 6 is a diagram illustrating a variable mounting sound wave touch pad according to another exemplary embodiment of the present disclosure.

Further, according to another exemplary embodiment of the present disclosure, as illustrated in FIG. 6, the variable mounting sound wave touch pad includes a microphone 110 recognizing the sound wave. A plurality of mounting members 210 include an upper touch pad 100 which is flexibly formed and a lower touch pad 200 which is spaced apart from the upper touch pad 100. One end of each mounting member 210 is attached to the lower touch pad 200 and another end thereof protrudes toward the upper touch pad 100. Each mounting member 210 has different heights.

That is, if the upper touch pad 100 is flexible and thus has a deformable shape while transferring the sound wave, when the height of the mounting member 210 is variously controlled, the upper touch pad 100 may also recognize the height of the mounting member 210, such that, a user may easily recognize which position is to be touched.

As described above, according to another exemplary embodiment of the present disclosure, the microphone 110 recognizes the touch position of the touch pad, and the mounting member 210 between upper and lower surfaces of the sound wave touch pad is differently grounded to the upper touch pad 100 at each position, and thus, different sound waves are generated even with the same touch impact, such that the microphone 110 may calculate the touch position of the touch pad.

The control function can be recognized by touch, and since other structures can be grounded to the upper touch pad 100 of the sound wave touch pad depending on the situation, different touches and sound waves may be generated when an audio function and navigation are controlled in a vehicle. When a specific portion of the touch pad is tapped while driving, if a dull sound of high frequency is generated due to the fixing vibration, it may be recognized whether the controllable function is currently operated intentionally based on the pressing sound and touch of the pad.

Further, a level of the function may be recognized by the touch, and if it is assumed that the user controls the audio function group, the audio function group moves to a lower level or otherwise moves an upper or previous level in a menu tree (function structure) as desired. For example, when an interface is designed in such a manner that as the function level is high, the number of grounds is reduced, and as the function level is low, the number of grounds is increased, it may be estimated whether the user controls the function at which a position of the menu tree depends on the pressed degree and the sound of the touch pad.

When all the mounting members 210 are grounded to the upper touch pad 100 by differentiating between the activation and the inactivation, all the mounting members 210 are fixedly vibrated. When all the mounting members 210 are not grounded, all the mounting members 210 are freely vibrated. Thus, the on/off of the sound wave touch pad may be easily recognized based on a difference in touch and sound even in a case of tapping.

Various functions may be controlled by the same touch impact. In a case of a rhythm pattern used in the sound wave touch pad, if it is assumed that a rhythm of two beats such as "tok, tok" is input as a touch, two commands may be input according to a case in which all the mounting members are freely vibrated since all the mounting members are not grounded, a case in which some of the mounting member are grounded, or a case in which all the mounting members are grounded. Even in the case of the input such as the rhythm input of two beats in the situation using the audio function group and the rhythm input of two beats in the situation using the video function group, different sound waves are generated depending on the grounding, and thus, a different command for each function group may be carried out.

Further, resolution of the interface may be controlled, and the number of mounting members 210 may be set depending on a kind of information to be handled and the number of commands. When the resolution of information or interaction is not high, the mounting members 210 may be configured in only one or two. When the command is differently set for each position of the touch pad, or when several times of the touch input is required, the number of mounting member 210 is configured in plural, thereby increasing the resolution of interaction.

Further, many functions may be controlled with a small number of inputs and even in the case of the input such as the position differentiation in the sound wave touch pad, different sound waves may be generated, and therefore, when a plurality of touches of the rhythm patterns are input, the number of touches or the length of the rhythm may be remarkably reduced. When the number of touches to be knocked is increased, the user has a difficulty in remembering the command. However, according to the exemplary embodiment of the present disclosure, the input frequency is reduced, and even in the case of the input of "tok, tok" when the mounting members are grounded, different sounds are generated in a manner such as "tok, tik", such that the learning may be easily made.

As described above, according to the exemplary embodiments of the present disclosure, the mounting member may be deformed by interlocking with the actuator to generate the sound wave in response to the touch impact. The mounting member recognizes the touch position of the touch pad to generate the sound waves for each control function when the touch pad is touched. The cognition of the user for the user convenience and safety is improved, and the sound wave may be generated in response to the control function. Further, it is possible to detect the operation even by a small number of touches, thereby improving the marketability.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions, and substitutions should also be understood to fall within the scope of the present disclosure.

What is claimed is:

1. A variable mounting sound wave touch pad, comprising:
    an upper touch pad connected to a microphone to recognize a sound wave;
    a lower touch pad spaced apart from the upper touch pad; and
    a plurality of mounting members having one end attached to the lower touch pad and another end protruding toward the upper touch pad, heights of the mounting members varying by an actuator which interlocks with the lower touch pad.

2. The variable mounting sound wave touch pad according to claim 1, wherein the upper touch pad is connected to one microphone.

3. The variable mounting sound wave touch pad according to claim 1, wherein the actuator deforms the mounting members and interlocks with a system controller which classifies and processes a sound wave signal.

4. The variable mounting sound wave touch pad according to claim 3, wherein the system controller performs a control to change vibration characteristics of the upper touch pad depending on positions at which the mounting members are grounded to the upper touch pad or the number of grounded mounting members.

5. The variable mounting sound wave touch pad according to claim 1, wherein the mounting members are provided with an electroactive polymer, and a shape of the electroactive polymer deforms when an electrical signal is applied.

6. The variable mounting sound wave touch pad according to claim 1, wherein the mounting members are provided with a solenoid plunger which moves when an electrical signal is applied.

7. The variable mounting sound wave touch pad according to claim 1, wherein the mounting members are provided with a piezoelectric ceramic element, and a shape of the piezoelectric ceramic element deforms by a pressure generated thereon when an electrical signal is applied.

8. The variable mounting sound wave touch pad according to claim 1, wherein the plurality of mounting members attached to the lower touch pad have different heights in which the mounting members and the upper touch pad are either grounded to each other or are not grounded to each other.

9. A variable mounting sound wave touch pad, comprising:
   an upper touch pad connected to a microphone to recognize a sound wave and, the upper touch pad flexibly formed;
   a lower touch pad spaced apart from the upper touch pad; and
   a plurality of mounting members having one end attached to the lower touch pad and another end protruding toward the upper touch pad, heights of each mounting member being different.

* * * * *